US011328305B2

(12) United States Patent
Sugimoto et al.

(10) Patent No.: US 11,328,305 B2
(45) Date of Patent: May 10, 2022

(54) METHOD FOR AT LEAST ONE BUSINESS OPERATOR TO PROVIDE SERVICES TO CUSTOMERS UTILIZING A NETWORK, AND THE NETWORK FOR THE SAME

(71) Applicants: MUFG BANK, LTD., Tokyo (JP); MITSUBISHI UFJ NICOS CO., LTD., Tokyo (JP)

(72) Inventors: Riki Sugimoto, Tokyo (JP); Yasushi Kuwabara, Tokyo (JP)

(73) Assignees: MUFG Bank, Ltd., Tokyo (JP); Mitsubishi UFJ NICOS Co., Ltd., Tokyo (JP)

( * ) Notice: Subject to any disclaimer, the term of this patent is extended or adjusted under 35 U.S.C. 154(b) by 44 days.

(21) Appl. No.: 16/628,511

(22) PCT Filed: Jun. 20, 2018

(86) PCT No.: PCT/JP2018/023507
§ 371 (c)(1),
(2) Date: Jan. 3, 2020

(87) PCT Pub. No.: WO2019/009074
PCT Pub. Date: Jan. 10, 2019

(65) Prior Publication Data
US 2020/0160350 A1 May 21, 2020

(30) Foreign Application Priority Data
Jul. 5, 2017 (JP) .............................. JP2017-132193

(51) Int. Cl.
*G06Q 30/00* (2012.01)
*H04L 9/06* (2006.01)

(52) U.S. Cl.
CPC ......... *G06Q 30/016* (2013.01); *H04L 9/0643* (2013.01); *H04L 2209/38* (2013.01); *H04L 2209/56* (2013.01)

(58) Field of Classification Search
CPC . G06Q 30/016; H04L 9/0643; H04L 2209/38; H04L 2209/56
(Continued)

(56) References Cited

U.S. PATENT DOCUMENTS

2017/0201582 A1  7/2017  Zhang et al.

FOREIGN PATENT DOCUMENTS

| CN | 105653291 A | 6/2016 |
| JP | 2015-95201 | 4/2015 |
| WO | 2017/145389 | 3/2018 |

OTHER PUBLICATIONS

Jul. 10, 2017 press release: "Cloud Standards Customer Council Publishes Cloud Customer Architecture for Blockchain Whitepaper" at https://www.businesswire.com/news/home/20170710005749/en/Cloud-Standards-Customer-Council-Publishes-Cloud-Customer-Architecture-for-Blockchain-Whitepaper.*
(Continued)

*Primary Examiner* — Daniel A Hess
(74) *Attorney, Agent, or Firm* — Renner, Otto, Boisselle & Sklar, LLP (57) ABSTRACT

Provided is a method for one or more businesses to provide services to customers using a network. Also provided is a network that comprises a plurality of nodes. At least some of the plurality of nodes store data that is necessary for one or more businesses to provide services to customers. At least some of the plurality of nodes can process data. Terminal devices associated with customers can be connected to at least one of the plurality of nodes. The method involves terminal devices being connected to one of the plurality of
(Continued)

nodes and services being provided to customers by one or more business via the terminal devices and the network without going through the businesses.

8 Claims, 3 Drawing Sheets

(58) Field of Classification Search
USPC .......................................................... 705/34
See application file for complete search history.

(56) References Cited

OTHER PUBLICATIONS

Screenshot from web.archive.org dated Jun. 6, 2021 showing the web crawler history for http://www.cloud-council.org/deliverables/cloud-customer-architecture-for-blockchain.htm demonstrating that the download page for the article "Cloud Customer Architecture for Blockchain" was first captured on Jul. 2, 2017.*
Invitation to Respond to Written Opinion for corresponding Singapore Application No. 11201912727P dated Sep. 21, 2020, including Search Report and Written Opinion.
Cloud Customer Architecture for Blockchain, Cloud Standards Customer Council, Jun. 22, 2017, p. 2 lines 7-10, p. 3 lines 17-27, p. 9 lines 25-36, p. 13 lines 13-21, p. 14 lines 26-44.
Marko Vukolic, "Hyperledger Fabric an open-source distributed operating system for permissioned blockchains." Swiss Blockchain Summer School, IBM Research—Zurich, Jun. 22, 2017.
International Search Report for related International Application No. PCT/JP2018/023507 dated Jul. 24, 2018.
Official Action for corresponding Japanese Patent Application No. 2017-132193 dated Aug. 21, 2018 and its English translation.
Decision to Grant for corresponding Japanese Patent Application No. 2017-132193 dated Sep. 27, 2018 and its English translation.
Okino Seiichi, Security requirements for Distributed Book Technology : Application to Bank Account Transfer Processing, Discussion of Bank Finance Research Institute IMES Discussion Paper Series No. 2017-J-6 [online], Mar. 23, 2017, pp. 1-19, and partial English translation.
New Technologies to Watch in 2017: Changing the Corporate nNet, Nikkei Communication No. 636, Jan. 1, 2017, pp. 16-20, 2017, and partial English translation.
Search Report and Examination Report for corresponding Singapore Application No. 11201912727P dated Dec. 16, 2020.
Cloud Customer Architecture for Blockchain, Cloud Standards Customer Council, Jul. 10, 2017, p. 2 lines 7-10, p. 3 lines 17-27, p. 9 lines 25-36, p. 13 lines 13-21, p. 14 lines 26-44. (correct date identified in present citation).

* cited by examiner

METHOD FOR AT LEAST ONE BUSINESS OPERATOR TO PROVIDE SERVICES TO CUSTOMERS UTILIZING A NETWORK, AND THE NETWORK FOR THE SAME

TECHNICAL FIELD

The present invention relates to a method for at least one business operator to provide services to customers utilizing a network, and the network for the same.

BACKGROUND ART

The age of providing better and advanced services has come due to the development of IT technology and growth of IT industry. Providing better and advanced services requires quick and certain transmission of information to a person who wants the information. This is required even more in a service with "transfer of value".

Conventional techniques are specifically explained below.

Each of business operators such as card business operators, point business operators, or electronic money business operators had conventionally constructed an individual system for providing each of their services to customers.

Figure 4:
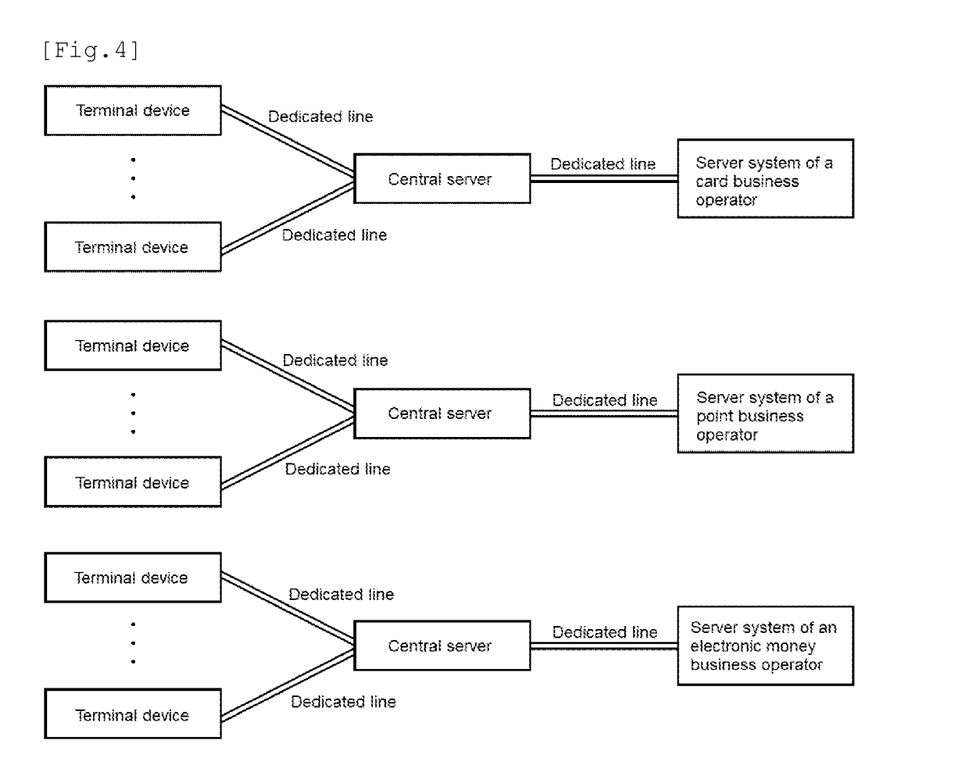
FIG. 4 A figure showing one example of the configuration of a conventional system of a card business operator, a conventional system of a point business operator, and a conventional system of an electronic money business operator

FIG. 4 shows one example of the configuration of a conventional system of a card business operator, a conventional system of a point business operator, and a conventional system of an electronic money business operator.

Each business operator had constructed an individual server system, and connected the server system on the business operator side with a terminal device on the customer side via a central server and a dedicated line provided by a network business operator, thereby provided each business operator's service to customers.

One example of such a conventional system of a point business operator is also described in Patent Literature 1.

CITATION LIST

Patent Literature

[PTL 1] Japanese Laid-Open Publication No. 2015-95201

SUMMARY OF INVENTION

Technical Problem

The Applicant recognized that the conventional techniques have problems to be solved, which are (1) the data management cost which is necessary for each business operator is very expensive, (2) the data communication cost which is necessary for each business operator is very expensive, and (3) the difficulty in dealing with a vast amount of data because the data processing amount in each business operator depends on the ability of a central server provided by a network business operator.

The present invention has been invented to solve the above problems. The objective of the present invention is to provide a method which enables at least one business operator to provide services to customers utilizing a network without needing to perform processing necessary for each business operator to provide the services to the customers in a server system of each business operator and without needing to utilize a dedicated line and a central server, and the network for the same.

The present invention provides a business model that can be applied to any service, particularly provides a business model suitable for a service with "transfer of value".

Solution to Problem

The method of the present invention is a method for at least one business operator to provide a service to a customer utilizing a network comprising a plurality of nodes, wherein: data necessary for at least one business operator to provide a service to a customer is stored in at least some of the plurality of nodes; the at least some of the plurality of nodes are configured to be capable of processing the data; and a terminal device associated with the customer is configured to be capable of being connected to one of the plurality of nodes, the method comprising: connecting the terminal device to one of the plurality of nodes; and achieving providing, by the at least one business operator, the service to the customer between the terminal device and the network without intervention of the at least one business operator. The above objective is thereby achieved.

A device of the at least one business operator is configured to be capable of being connected to one of the plurality of nodes, and a result of providing the service which is achieved between the terminal device and the network may be transmitted to the device of the at least one business operator.

The result of providing the service may be transmitted to the device of the at least one business operator at a time after a time at which providing the service is achieved.

The service that the at least one business operator provides to the customer may be based on at least one of managing credit by the at least one business operator and managing balance by the at least one business operator.

The at least one business operator may include a card business operator, a point business operator and an electronic money business operator.

At least some of the plurality of nodes may constitute a blockchain, and data necessary for the at least one business operator to provide a service to a customer may be managed by utilizing a blockchain technique.

The network of the present invention is a network comprising a plurality of nodes, wherein: data necessary for at least one business operator to provide a service to a customer is stored in at least some of the plurality of nodes, the at least some of the plurality of nodes being configured to be capable of processing the data; a terminal device associated with the customer is configured to be capable of being connected to one of the plurality of nodes; and providing, by the at least one business operator, the service to the customer is achieved between the terminal device and the network without intervention of the at least one business operator. The above objective is thereby achieved.

Advantageous Effects of Invention

According to the present invention, it is possible to provide a method which enables at least one business operator to provide services to customers utilizing a network without needing to perform processing necessary for each business operator to provide the services to the customers in a server system of each business operator and without needing to utilize a dedicated line and a central server, and the network for the same.

DESCRIPTION OF EMBODIMENTS

The embodiments of the present invention are explained hereinafter with reference to the drawings.

Figure 1:
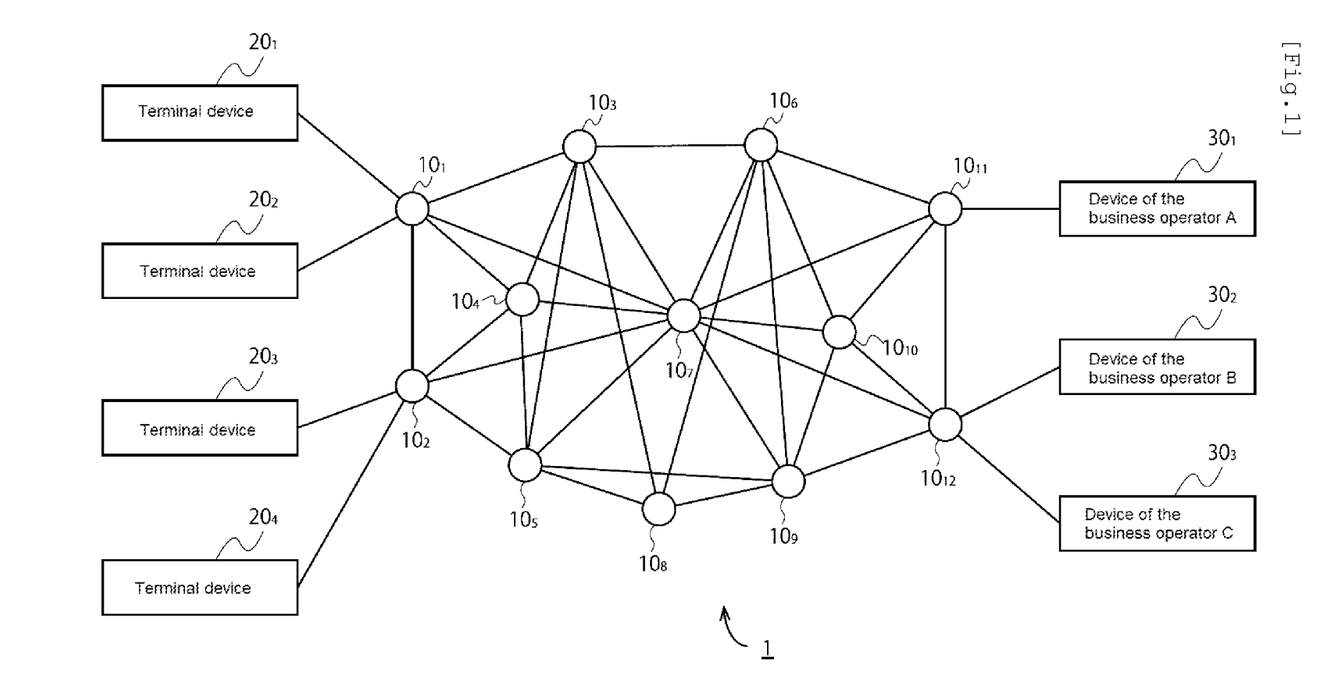
FIG. 1 A figure showing the concept of a business model for at least one business operator to provide a service to a customer utilizing a network FIG. 2A A figure showing one example of a data flow between terminal devices $20_1$ and $20_2$, and a network 1

FIG. 1 shows the concept of a business model for at least one business operator to provide a service to a customer utilizing a network.

A network 1 comprises a plurality of nodes $10_1, 10_2, \ldots 10_N$. In the example shown in FIG. 1, N=12. However, the present invention is not limited to this. N can be any integer of 2 or more. Data which is necessary for at least one business operator to provide a service to a customer is stored in at least some of the plurality of nodes $10_1, 10_2, \ldots 10_N$. Further, at least some of the plurality of nodes $10_1, 10_2, \ldots 10_N$ are configured to be capable of processing data which is necessary for at least one business operator to provide a service to a customer. In this regard, the service can be any type of service. For example, the service can be, but is not limited to, a financial service or an electronic settlement service for materializing "transfer of value".

In this manner, the ability of at least some of the plurality of nodes $10_1, 10_2, \ldots 10_N$ to store data which is necessary for at least one business operator to provide a service to a customer enables management of the data which is necessary for at least one business operator to provide a service to a customer in the network 1. Further, the ability of at least some of the plurality of nodes $10_1, 10_2, \ldots 10_N$ to process the data enables performing processing of the data in the network 1. Some nodes having the ability to store data which is necessary for at least one business operator to provide a service to a customer may be identical to or different from some nodes having the ability to process the data. When a node having the ability to store the data is different from a node having the ability to process the data, for example, it is possible to properly process data stored in one node in the other node by communication between one node and the other node.

In this manner, the network 1 is configured to be capable of managing data which is necessary for at least one business operator to provide a service to a customer in the network 1, and to be capable of processing the data in the network 1. The Applicant calls such network 1 an "intelligentized" network. That is because the network 1 does not only comprise the function as a mere transmission path but also both the function of managing data and the function of processing data. In this manner, due to the use of the intelligentized network 1, each business operator no longer needs to construct an individual server system for collectively managing such data and no longer needs to utilize a dedicated line and a central server for transmitting such data. It is thereby possible to prevent data to be processed from concentrating on the server system of each business operator, and possible to greatly decrease the cost necessary for each business operator to individually manage data. Furthermore, eliminating the need for utilization of a dedicated line enables securing easy connection with a terminal device and enables greatly reducing the communication cost. Furthermore, eliminating the need for utilization of a central server enables the processing amount of data to not be limited by the ability of the central server. As a result, the availability of processing of data can be dramatically improved.

The data management and the data processing performed in the intelligentized network 1 are optimized so that the processing speed of data and/or processing amount of data are maximized. The approach of optimization does not matter. For example, optimization is preferably performed in such a manner so as to enable processing in the order of one hundred thousand cases to one million cases per second.

The intelligentized network 1 can be materialized by using, for example, a blockchain (distributed ledger), a content delivery network, or an operation server. Utilization of a blockchain (distributed ledger) enables materialization of high security utilizing a plurality of devices that distributedly manage data without requiring a server system of high security that collectively manages data. However, the configuration for materializing the intelligentized network 1 is not limited to the configuration utilizing a blockchain (distributed ledger). The intelligentized network 1 having any hardware configuration and/or any software configuration remains within the scope of the present invention as long as it is possible to materialize the intelligentized network 1 having the above-described function.

Each of a plurality of terminal devices $20_1, 20_2, \ldots 20_M$ is associated with a customer. In the example shown in FIG. 1, M=4. However, the present invention is not limited to this. M can be any integer of 2 or more. Each of the plurality of terminal devices $20_1, 20_2, \ldots 20_M$ is configured to be capable of being connected to one of the plurality of nodes $10_1, 10_2, \ldots 10_N$. For example, the terminal device $20_1$ can be connected to, but not limited to, a node which is the closest to the terminal device $20_1$ among the plurality of nodes $10_1, 10_2, \ldots 10_N$. The embodiment of connecting each of the plurality of terminal devices $20_1, 20_2, \ldots 20_M$ to one of the plurality of nodes $10_1, 10_2, \ldots 10_N$ is optional. For example, it is possible to, but is not limited to, utilize an open network such as the Internet to connect a terminal device 20 to one of the plurality of nodes $10_1, 10_2, \ldots 10_N$. One example of each of the plurality of terminal devices $20_1, 20_2, \ldots 20_M$ includes, but is not limited to, a terminal device installed in a store in which a customer shops, a terminal device installed in an EC (electronic commerce) member store in which a customer shops, a terminal device that a customer utilizes (e.g., a smartphone on which a specific application such as Wallet application has been installed), a terminal device which is incorporated in an object that a customer utilizes (e.g., an in-vehicle ETC device or household electric appliances) and the like.

As shown in FIG. 1, once the terminal device $20_1$ is connected to the node $10_1$ in the network 1, the communication is performed between the terminal device $20_1$ and at least one node in the network 1, which thereby achieves providing, by at least one business operator, a service to a customer. That is, providing, by at least one business operator, a service to a customer, is achieved between the terminal device $20_1$ and the network 1 without intervention of at least one business operator.

Figure 2A:
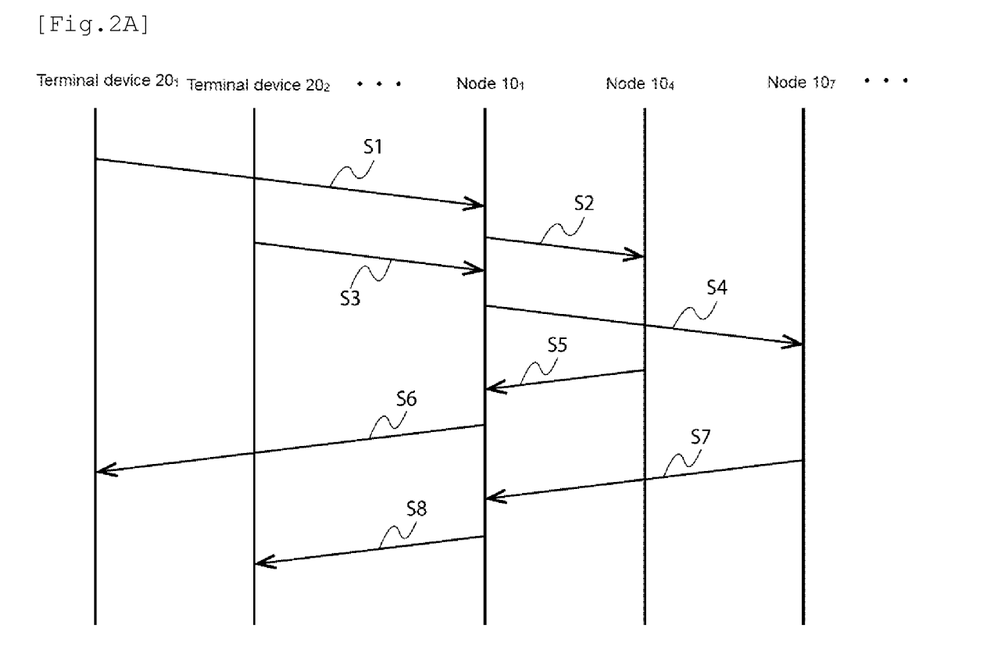
Figure 2B:
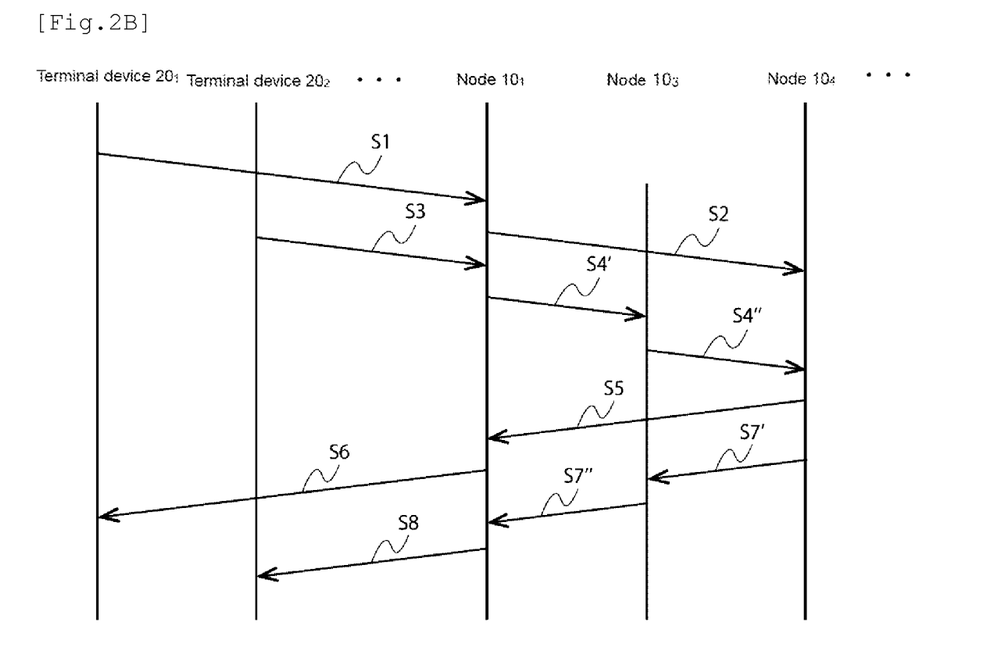
FIG. 2B A figure showing one example of a data flow between terminal devices $20_1$ and $20_2$, and a network 1

FIG. 2A and FIG. 2B show one example of a data flow between the terminal devices $20_1$ and $20_2$, and the network 1. In the example shown in FIG. 2A and FIG. 2B, it is assumed that data necessary for a certain business operator to provide a service to a customer is distributedly managed in the nodes $10_4$, $10_7$, and $10_{10}$ in the network 1.

For example, when the terminal device $20_1$ is connected to the node $10_1$ in the network 1, the terminal device $20_1$ sends a request for a service that the customer desires (hereinafter, referred to as the "service request") to the node $10_1$ (S1 of FIG. 2A). The node $10_1$ has a function of determining in which of the nodes $10_4$, $10_7$, and $10_{10}$ data necessary for performing processing for the service request received from the terminal device $20_1$ is managed. When it is determined that the data is managed in the node $10_4$, the node $10_1$ forwards the service request to the node $10_4$ (S2 of FIG. 2A). The node $10_4$ receives the service request from the node $10_1$ and executes processing for the service request based on the data necessary for the processing for the service request. The node $10_4$ returns the result of the processing for the service request to the terminal device $20_1$ via the node $10_1$ (S5 and S6 of FIG. 2A). However, the node executing processing for a service request is not limited to the node $10_4$. For example, in the case wherein the node $10_1$ receives a service request from the terminal device $20_1$ and then the node $10_1$ immediately receives another service request from the terminal device $20_2$ connected to the node $10_1$ (S3 of FIG. 2A), the node $10_1$ forwards the another service request to the node $10_7$ when it is determined that data necessary for performing processing for the another service request is managed in the node $10_7$ (S4 of FIG. 2A). The node $10_7$ receives the another service request from the node $10_1$, and executes the processing for the another service request based on the data necessary for the processing for the another service request. The node $10_7$ returns the result of the processing for the another service request to the terminal device $20_2$ via the node $10_1$ (S7 and S8 of FIG. 2A).

In this manner, it is possible to prevent delay in processing due to concentration of the processing on a part of the nodes in the network 1 by distributing the nodes executing processing for a service request in the network 1.

Furthermore, even when the same node executes processing for service requests in the network 1, it is also possible to prevent delay in the processing due to the occurrence of congestion in a part of the routes in the network 1 by optimizing the route of a forward path leading to the same node (or the route of a return path returning from the same node).

For example, a route which directly forwards a service request from the node $10_1$ to the node $10_4$ without intervention of another node may be physically the shortest route. However, this route is not necessarily the fastest route. This is because congestion may occur between the node $10_1$ and the node $10_4$. In order to avoid such congestion, the node $10_1$ has a function of specifying the fastest route between the node $10_1$ and the node $10_4$. For example, the node $10_1$ specifies the fastest route by comparing and examining the direct forwarding route of the node $10_1 \rightarrow$ the node $10_4$, the indirect forwarding route of the node $10_1 \rightarrow$ the node $10_3 \rightarrow$ the node $10_4$, the indirect forwarding route of node $10_1 \rightarrow$ the node $10_2$, the node $10_4$, the indirect forwarding route of node $10_1 \rightarrow$ the node $10_3$, the node $10_7 \rightarrow$ the node $10_4$, the indirect forwarding route of node $10_1 \rightarrow$ the node $10_2 \rightarrow$ the node $10_2 \rightarrow$ the node $10_4$ and the like.

For example, in the case wherein the node $10_1$ receives a service request from the terminal device $20_1$ (S1 of FIG. 2B) and the node $10_1$ forwards the service request to the node $10_4$ via the direct forwarding route of the node $10_1 \rightarrow$ the node $10_4$ (S2 of FIG. 2B) and then the node $10_1$ immediately receives another service request from the terminal device $20_2$ connected to the node $10_1$, the node $10_1$ may specify one of the indirect forwarding routes other than the direct forwarding route which is utilized to forward the previous service request as the fastest route when it is determined that data necessary for performing processing for the another service request is managed in the node $10_4$. In this case, for example, the node $10_1$ can forward the another service request to the node $10_4$ via the indirect forwarding route of the node $10_1 \rightarrow$ the node $10_3$, the node $10_4$ (S4' and S4" of FIG. 2B). The node $10_4$ returns the result of the processing for the service request to the terminal device $20_1$ via the node $10_1$ (S5 and S6 of FIG. 2B), and returns the result of the processing for the another service request to the terminal device $20_2$ via the node $10_3$, the node $10_1$ (S7', S7" and S8 of FIG. 2B). The example shown in FIG. 2B shows, but is not limited to, an example in which the route of the forward path from the node $10_1$ to the node $10_4$ and the route of the return path from the node $10_4$ to the node $10_1$ go through the same node. The route of the forward path from the node $10_1$ to the node $10_4$ and the route of the return path from the node $10_4$ to the node $10_1$ may go through a different node.

In this manner, it is possible to prevent delay in processing due to the occurrence of congestion in a part of the routes in the network 1 by optimizing the route of a forward path leading to a node executing processing for a service request in the network 1 (or the route of a return path returning from the node).

In the embodiment described above with reference to FIG. 2A and FIG. 2B, the node $10_1$ has a function of determining in which of the nodes $10_4$, $10_7$, and $10_{10}$ the data necessary for performing processing for a service request is managed. In this regard, it does not matter how such a determining function is materialized. For example, each node may autonomously make such a determination, or each node may receive an instruction from a controller controlling the flow of the whole processing of the network 1 to make a determination in accordance with the instruction. Furthermore, in the embodiment described above with reference to FIG. 2A and FIG. 2B, the node $10_1$ has a function of specifying the fastest route between the node $10_1$ and the node $10_4$. In this regard, it does not matter how such a specifying function is materialized. For example, each node may autonomously specify the fastest route, or each node may receive an instruction from a controller controlling the flow of the whole processing of the network 1 to specify the fastest route in accordance with the instruction. The same applies to each of the node $10_2$, ... $10_N$.

Each of devices $30_1$, $30_2$, ... $30_K$ of at least one business operator is configured to be capable of being connected to one of the plurality of nodes $10_1$, $10_2$, ... $10_N$. In the example shown in FIG. 1, K=3. However, the present invention is not limited to this. K can be any integer of 1 or more. For example, the device $30_1$ of a business operator A can be connected to, but not limited to, a node which is the closest to the device $30_1$ of the business operator A among the plurality of nodes $10_1$, $10_2$, ... $10_N$. When providing, by the business operator A, a service to a customer is achieved between the network 1 and a terminal device (e.g., terminal device $20_1$) connected to a node in the network 1, the result of providing the service is transmitted to the device $30_1$ of the business operator A. Transmitting the result of providing the service to the device $30_1$ of the business operator A is not performed at the same time (that is, real time) as the time of the achievement of providing, by the business operator A, a service to a customer. Instead, transmitting the result of providing the service to the device $30_1$ of the business operator A is performed at the time after the time of the achievement of providing, by the business operator A, a service to a customer. It is thereby possible to prevent the load of the processing from concentrating on a node in the network 1 or the device $30_1$ of the business operator A.

A specific example of the above-described business model is explained below with reference to an example in which a business operator A is a credit card business operator, a business operator B is a point business operator and a business operator C is an electronic money business operator. The above-described business model can be applied to any service, and in particular, is preferably applied to a service with "transfer of value". This is because the service with "transfer of value" requires being able to deal with high security, quick response, and a huge processing amount.

The business operator A (credit card business operator) provides a credit card service to a customer. One example of the credit card service is, but not limited to, enabling the customer to utilize a credit card. The credit card service is based on the credit management by the business operator A. This credit management is performed by, for example, setting the credit limit for each customer.

The business operator B (point business operator) provides a point service to a customer. One example of the point service is, but not limited to, giving points, or enabling the customer to utilize points. The point service is based on the balance management of points by the business operator B. This balance management is performed by, for example, managing the balance (remaining amount) of points for each customer.

The business operator C (electronic money business operator) provides an electronic money service to a customer. One example of the electronic money service is, but not limited to, performing charging with electronic money, or enabling the customer to utilize electronic money. The electronic money service is based on the balance management of electronic money by the business operator C. This balance management is performed by, for example, managing the balance (remaining amount) of electronic money for each customer.

Utilization of a credit card is considered below as one example of the credit card service.

Assuming a case in which a customer wants to utilize a credit card when purchasing an item in a store. In this case, a terminal device installed in the store is connected to one of the plurality of nodes $10_1, 10_2, \ldots 10_N$. For example, if the terminal device $20_1$ is connected to the node $10_1$, the terminal device $20_1$ sends information indicating that the desired amount of the credit card of the customer is "oo yen" to the network 1. In response to the information sent from the terminal device $20_1$, the network 1 determines whether the desired amount of the credit card by the customer is at or below the credit limit. Such determination is made in the network 1. Such determination is made based on the credit management of the credit card because data which is necessary for this credit management is managed in the network 1 and processing of the data which is necessary for this credit management is performed in the network 1. Thus, such determination is made in the network 1 without intervention of a server device installed in the business operator A. When the desired amount of the credit card by the customer is at or below the credit limit, the network 1 permits the customer to utilize the credit card and updates the spent amount of the credit card by the customer. Such update of the spent amount is achieved by updating data necessary for the credit management which is managed in the network 1. In this manner, performing the processing related to utilization of the credit card by the customer in the network 1 enables quick return of the result of the processing to the customer even when the business operator A is busy. The response of the processing is thereby becomes quicker.

The processing related to utilization of the credit card by the customer is performed between the terminal device $20_1$ and the network 1. Meanwhile, the result of the processing related to utilization of the credit card by the customer is not transmitted to the device $30_1$ of the business operator A at the same time (that is, real time) as the time at which the processing is performed. Instead, the result of the processing related to utilization of the credit card by the customer is transmitted to the device $30_1$ of the business operator A after the time at which the processing is performed. It is thereby possible to report the result of the processing related to utilization of the credit card by the customer to the business operator A while avoiding concentration of the load of the processing on the network 1 and/or the device $30_1$ of the business operator A.

Utilization of points is considered below as one example of the point service.

Assuming a case in which a customer wants to utilize points when purchasing an item by utilizing EC (electronic commerce). In this case, a terminal device installed in an EC (electronic commerce) member store is connected to one of the plurality of nodes $10_1, 10_2, \ldots 10_N$. For example, if the terminal device $20_2$ is connected to the node $10_1$, the terminal device $20_2$ sends information indicating that the desired amount of points of the customer is "AA points" to the network 1. In response to the information sent from the terminal device $20_2$, the network 1 determines whether the desired amount of points by the customer is at or below the balance of points. Such determination is made in the network 1. This is because such determination is made based on the balance management of points, in which data necessary for this balance management is managed in the network 1 and processing of the data necessary for this balance management is performed in the network 1. Thus, such determination is made in the network 1 without intervention of a server device installed in the business operator B. When the desired amount of points by the customer is at or below the balance of points, the network 1 permits the customer to utilize points and updates the balance of points of the customer. Such update of the balance of points is achieved by updating the data necessary for the balance management managed in the network 1. In this manner, performing the processing related to utilization of points by the customer in the network 1 enables quick return of the result of the processing to the customer even when the business operator B is busy. The response of the processing thereby becomes quicker.

The processing related to utilization of points by the customer is performed between the terminal device $20_2$ and the network 1. Meanwhile, the result of the processing related to the utilization of points by the customer is not transmitted to the device $30_2$ of the business operator B at the same time (that is, real time) as the time at which the processing is performed. Instead, the result of the processing related to the utilization of points by the customer is transmitted to the device $30_2$ of the business operator B after the time at which the processing is performed. It is thereby possible to report the result of the processing related to utilization of points by the customer to the business operator B while avoiding concentration of the load of the processing on the network 1 and/or the device $30_2$ of the business operator B.

Utilization of electronic money is considered below as one example of the electronic money service.

Assuming a case in which a customer wants to utilize electronic money when purchasing an item by utilizing Wallet application installed on a smartphone. In this case, the smartphone (terminal device) is connected to one of the plurality of nodes $10_1$, $10_2$, ... $10_N$. For example, if the terminal device $20_3$ is connected to the node $10_2$, the terminal device $20_3$ sends information indicating that the desired amount of electronic money of the customer is "xx yen" to the network 1. In response to the information sent from the terminal device $20_3$, the network 1 determines whether the desired amount of electronic money by the customer is at or below the balance of electronic money. Such determination is made in the network 1. This is because such determination is made based on the balance management of electronic money, in which data necessary for this balance management is managed in the network 1 and processing of the data necessary for this balance management is performed in the network 1. Thus, such determination is made in the network 1 without intervention of a server device installed in the business operator C. When the desired amount of electronic money by the customer is at or below the balance of electronic money, the network 1 permits the customer to utilize electronic money and updates the balance of electronic money by the customer. Such update of the balance of electronic money is achieved by updating the data necessary for the balance management managed in the network 1. In this manner, performing the processing related to utilization of electronic money by the customer in the network 1 enables quick return of the result of the processing to the customer even when the business operator C is busy. The response of the result thereby becomes quicker.

The processing related to utilization of electronic money by the customer is performed between the terminal device $20_3$ and the network 1. Meanwhile, the result of the processing related to utilization of electronic money by the customer is not transmitted to the device $30_3$ of the business operator C at the same time (that is, real time) as the time at which the processing is performed. Instead, the result of the processing related to utilization of electronic money by the customer is transmitted to the device $30_3$ of the business operator C after the time at which the processing is performed. It is thereby possible to report the result of the processing related to utilization of electronic money by the customer to the business operator C while avoiding concentration of the load of the processing on the network 1 and/or the device $30_3$ of the business operator C.

Figure 3:
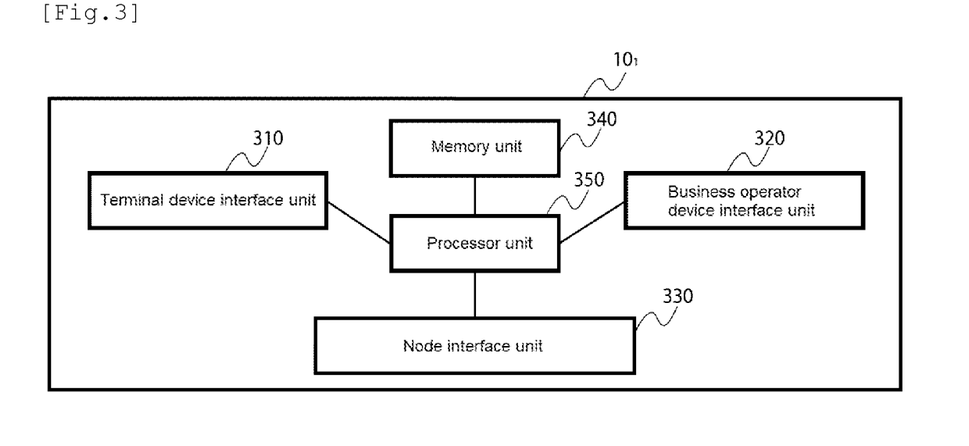
FIG. 3 A figure showing one example of the configuration of a node $10_1$ comprised in a network 1

FIG. 3 shows one example of the configuration of the node $10_1$ comprised in the network 1. The configuration of each of the nodes $10_2$, ... $10_N$ comprised in the network 1 is also the same as the configuration of the node $10_1$.

The node $10_1$ is a device configured to be capable of communicating with at least one of a plurality of terminal devices $20_1$, $20_2$, ... $20_M$, communicating with at least one of the devices $30_1$, $30_2$, ... $30_K$ of at least one business operator, and communicating with at least one of the nodes $10_2$, ... $10_N$. The embodiment of such communication does not matter. For example, the embodiment of such communication may be wireless communication or may be wired communication. Such a device can be, for example, a computer of any type.

The node $10_1$ comprises a terminal device interface unit 310, a business operator device interface unit 320, a node interface unit 330, a memory unit 340, and a processor unit 350. These components are interconnected. Each of these components may be composed of a single hardware part, or may be composed of a plurality of hardware parts.

The terminal device interface unit 310 controls communication with at least one of the plurality of terminal devices $20_1$, $20_2$, ... $20_M$.

The business operator device interface unit 320 controls communication with at least one of the devices $30_1$, $30_2$, ... $30_K$ of at least one business operator.

The node interface unit 330 controls communication with at least one of the nodes $10_2$, ... $10_N$.

A program necessary for executing processing related to various services, data necessary for executing the program, or the like is stored in the memory unit 340. In this regard, it does not matter how the program is stored in the memory unit 340. For example, the program may be preinstalled on the memory unit 340. Alternatively, the program may be installed on the memory unit 340 by being downloaded via a network such as the Internet, or may be installed on the memory unit 340 via a storage medium such as an optical disk or USB.

The processor unit 350 controls the operation of the entire node $10_1$. The processor unit 350 reads a program stored in the memory unit 340 and executes the program. The node $10_1$ can thereby function as a device executing a desired step.

The present invention has been exemplified with preferable embodiments of the present application, but the present invention should not be interpreted to be limited to the embodiments. It is understood that the scope of the present invention should be interpreted based solely on the Claims. It is understood that those skilled in the art can implement an equivalent scope from the descriptions of the specific preferred embodiments of the present invention based on the description of the present invention and common general knowledge.

INDUSTRIAL APPLICABILITY

The present invention is useful as an invention providing a method which enables at least one business operator to provide services to customers utilizing a network without needing to perform processing necessary for each business operator to provide the service to the customer in a server system of each business operator and without needing to utilize a dedicated line and a central server, the network for the same, and the like.

REFERENCE SIGNS LIST

1 Network
$10_1$, $10_2$, ... $10_N$ Node
$20_1$, $20_2$, ... $20_M$ Terminal device
$30_1$, $30_2$, ... $30_K$ Device of a business operator
310 Terminal device interface unit
320 Business operator device interface unit
330 Node interface unit
340 Memory unit
350 Processor unit

The invention claimed is:

1. A method for a business operator to provide a service to a customer utilizing a network comprising a plurality of nodes, wherein: data necessary for a business operator to provide a service to a customer is stored in at least some first nodes of the plurality of nodes; the at least some first nodes are configured to be capable of processing the data; a terminal device associated with the customer is configured to be capable of being connected to one of the plurality of nodes; and a device of the business operator is configured to be capable of being connected to one of the plurality of nodes, the method comprising:

connecting, by the terminal device, to a second node, which is one of the plurality of nodes;

sending, by the terminal device, a request for a service that the customer desires to the second node, the request including a utilization content of the service that the customer desires;

determining, by the second node, which node among the at least some first nodes stores data necessary for performing processing for the request received from the terminal device, and forwarding, by the second node, the request to a third node, which is determined to store the data necessary for performing the processing for the request;

updating, by the third node, the data based on the data necessary for performing the processing for the request and the utilization content of the service that the customer desires, and returning, by the third node, the updated data to the terminal device via the second node;

connecting, by the device of the business operator, to a fourth node, which is one of the plurality of nodes;

transmitting, by the third node, the updated data to the device of the business operator via the fourth node, wherein the updated data is transmitted to the device of the business operator after a time at which the service is provided to the customer.

2. The method of claim 1, wherein the service that the business operator provides to the customer is based on at least one of managing credit by the business operator and managing balance by the business operator.

3. The method of claim 2, wherein the business operator is any of a card business operator, a point business operator, and an electronic money business operator.

4. The method of claim 3, wherein the at least some first nodes constitute a blockchain, and the data necessary for the business operator to provide the service to the customer is managed by utilizing a blockchain technique.

5. The method of claim 1, wherein the business operator is any of a card business operator, a point business operator, and an electronic money business operator.

6. The method of claim 5, wherein the at least some first nodes constitute a blockchain, and the data necessary for the business operator to provide the service to the customer is managed by utilizing a blockchain technique.

7. The method of claim 1, wherein the at least some first nodes constitute a blockchain, and the data necessary for the business operator to provide the service to the customer is managed by utilizing a blockchain technique.

8. A network comprising a plurality of nodes, wherein:

data necessary for a business operator to provide a service to a customer is stored in at least some first nodes of the plurality of nodes, the at least some first nodes being configured to be capable of processing the data;

a terminal device associated with the customer is configured to be capable of being connected to one of the plurality of nodes;

a device of the business operator is configured to be capable of being connected to one of the plurality of nodes;

the terminal device connects to a second node, which is one of the plurality of nodes;

the terminal device sends a request for a service that the customer desires to the second node, the request including a utilization content of the service that the customer desires;

the second node determines which node among the at least some first nodes stores data necessary for performing processing for the request received from the terminal device, and forwards the request to a third node, which is determined to store the data necessary for performing the processing for the request;

the third node uprates the data based on the data necessary for performing the processing for the request and the utilization content of the service that the customer desires, and returns the updated data to the terminal device via the second node;

the device of the business operator connects to a fourth node, which is one of the plurality of nodes;

the third node transmits the updated data to the device of the business operator via the fourth node; and the updated data is transmitted to the device of the business operator after a time at which the service is provided to the customer.

* * * * *